Patented Oct. 19, 1943

2,332,260

UNITED STATES PATENT OFFICE 2,332,260

ADHESIVITY OF ASPHALTS TO MINERAL AGGREGATES

Joseph C. Roediger, Brooklyn, N. Y., assignor, by mesne assignments, to Standard Catalytic Company, a corporation of Delaware No Drawing. Application November 30, 1939, Serial No. 306,855

1 Claim. (Cl. 106—281)

This invention relates to the coating of mineral aggregates with different types of bituminous compositions whereby firm permanent bonds between the coatings and the aggregates are obtained with consequent increase in the lengths of the life of the finished products.

It has heretofore been required to dry mineral aggregates which are to be bonded by means of asphalts, especially where hot application procedures are followed as it is very difficult to obtain a uniform coating of the asphalt in the presence of water. On mixing a wet mineral aggregate and an untreated asphalt, stripping frequently occurs with the result that mineral aggregate is obtained which is only partially coated. This partially coated aggregate is easily stripped of the asphalt, especially if there is an early exposure to the action of water, that is, a heavy rainfall occurring shortly after the laying operation.

One of the objects of the present invention is to permit the coating of the surfaces of damp or wet aggregates with a bituminous composition in such a manner that the coating obtained is satisfactory and produces a firmly bonded mass.

A further object of this invention is to prepare a paving mixture bonded with asphalt in which the asphalt coating when applied to either dry or wet aggregate is not readily displaced or stripped when subjected to the action of water.

Other objects of the invention will be readily understood on reading the following description of the invention.

It has been proposed that wetting agents, such as heavy metal salts of fatty acids, naphthenic acids or sulfonic acids prepared in the refining of petroleum oils, be incorporated in an asphalt to increase the adhesivity, (i. e. resistance to displacement by water) and wetting power of the said asphalt. A substantial increase in the wetting power of asphalt and also in the adhesivity of the asphalt to the mineral aggregate is obtained by the addition of such heavy metal fatty acid salts, but if the mineral aggregate is wet, a satisfactory asphalt coating is not always obtained, that is, a coating that will satisfactorily cover the wet stone and also resist subsequent displacement by water. This wetting power and adhesivity vary according to the mineral aggregate on which the asphalt is applied. For example, it has been found that certain trap-rocks are not readily coated with treated asphalt when wet and the resulting coating, in any case, does not have sufficient adhesivity to offer high resistance to subsequent stripping by the action of water.

According to this invention, when an aggregate is treated with a small quantity, preferably 0.5 to 1% of hydrated lime prior to the application of the asphalt containing a metallic salt, such as lead naphthenate, the mineral aggregate will readily be coated when treated with asphalt at an elevated temperature and the resulting coating will generally display a high resistance to stripping by water action. Under similar conditions, untreated asphalt when applied to dry aggregate will generally exhibit low resistance to stripping by water action and when applied to wet aggregate will generally fail to provide a satisfactory coating. Although the incorporation of a heavy metal salt into asphalt may permit the satisfactory coating of wet aggregate, lime pretreatment is often necessary to produce a coating of high adhesivity. This improvement in resistance to stripping by water action is especially noted when a wet or damp mineral aggregate is pretreated with 0.5 to 1% of hydrated lime prior to the application of the asphalt containing a metallic salt of a fatty acid.

The preliminary lime treating of mineral aggregate is not detrimental in that it does not lessen the coating power of the asphalt or the adhesivity of the asphalt and the mineral aggregate. There is generally some improvement in both the coating ability and the adhesivity properties of an asphalt that is applied to a lime-pretreated mineral aggregate even though an asphalt is used that readily coats the mineral aggregate. The lime pretreatment of mineral aggregate may be used with any asphalt containing heavy metal salts that may be added as adhesivity promoters.

In the following table the effects of lime pretreatment on adhesivity are illustrated. The stones used are obtained from the State of Virginia, except the last stone which was obtained in the State of New Jersey. The following procedure was used in evaluating the various mixtures:

The stone, graded to ¼–½ inch size, was drenched with distilled water and allowed to drain on a #10 mesh sieve for one minute.

The wet stone was transferred to a 16-ounce seamless tin can and 1% of V. M. & P. naphtha mixed with the wet stone. Following this, 6% of the asphalt under test and at 375°–400° F. was incorporated with the stone by stirring with a stiff knife. Vigorous mixing was continued for one minute. The resulting mix was evaluated as follows:

Mix evaluation

The per cent of aggregate surface coated with asphalt was visually estimated.

Adhesivity evaluation at 140° F.

After the mix was allowed to stand one hour at room temperature, it was placed in water maintained at 140° F. for 20 hours. At the completion of this period, the per cent of aggregate surface remaining coated with asphalt was determined.

HOT MIXING TESTS—VIRGINIA AGGREGATES

Mix Formula

Dry or wet aggregate mixes

| | | |
|---|---|---|
| Stone (dry or drenched) | gm | 200 |
| V. M. & P. naphtha | cc | 2.5 |
| 90/100 penetration asphalt added at temperature of 375° F | gm | 12 |

Wet aggregate plus lime mixes

| | | |
|---|---|---|
| Drenched stone | gm | 200 |
| Hydrated lime | gm | 1 |
| V. M. & P. naphtha | cc | 2.5 |
| 90/100 penetration asphalt added at temperature of 375° F | gm | 12 | maintained at 90° F. The breakdown of the track is taken as the number of revolutions of the machine required to loosen 300 lb. (10 per cent) of the total asphalt-aggregate mixture laid.

CIRCULAR TRACK TESTS

| Per cent Pb naph. in asphalt | Dry rock [1] | Dry rock plus lime pretreat.[2] | Wet rock [1] | Wet rock plus lime pretreat.[2] |
|---|---|---|---|---|
| 0 | 6,070 | | | 8,500 |
| 1.0 | 15,500 | 12,650 | 4,100 | 13,500 |

[1] No lime pretreatment.
[2] 0.5% hydrated lime.

The addition of lead naphthenate to the asphalt increased the life of the paving mixture when measured by the number of revolutions of wheels made around the circular track before failure of the track occurred. The rock used was New Jersey trap-rock and a dry rock bonded with asphalt withstood over 6000 revolutions of the wheels around the circular track before failure, while the same rock bonded with an asphalt containing 1% of lead naphthenate withstood more than twice as many revolutions of the wheels around the circular track. When the same rock was used wet and lime pretreated and then coated with asphalt it withstood over 8000 revolutions of

| Source of stone | pH of stone | Condition of aggregate | Treatment in asphalt: None | | 2.5% lead naphthenate | | 2.0% lead naphthenate | |
|---|---|---|---|---|---|---|---|---|
| | | | Mix evaluation [1] | Adhesivity,[2] 140° F. | Mix evaluation [1] | Adhesivity,[2] 140° F. | Mix evaluation [1] | Adhesivity,[2] 140° F. |
| Gravel #1 (Richmond S. & G.) | 6.3 | Dry | 100 | 0/5 | 95 | 90 | 100 | 90+ |
| | | Wet | 0 | | 80 | 70/80 | 70 | 20 |
| | | Wet-lime | 5/10 | | 90 | 90 | 80 | 30/40 |
| Gravel (Waynesboro stone) | 7.9 | Dry | 100 | 0/5 | 100 | 100 | 100 | 90 |
| | | Wet | 0 | 0 | 80 | 10 | 70 | 10 |
| | | Wet-lime | 0 | 0 | 100 | 60/70 | 90 | 10 |
| Gravel #2 (Richmond S. & G.) | 7.8 | Dry | 100 | 5 | 100 | 100 | 100 | 100 |
| | | Wet | 0 | 0 | 80/90 | 40 | 60/70 | 0/5 |
| | | Wet-lime | 10/20 | 0 | 90 | 70/80 | 80 | 20 |
| Granite (Trego stone) | 8.9 | Dry | 100 | 0/5 | 100 | 100 | 100 | 100 |
| | | Wet | 0/5 | 0/5 | 90 | 60 | 90 | 40 |
| | | Wet-lime | 0/5 | 0/5 | 90+ | 80/90 | 80/90 | 40 |
| Granite (Sunnyside granite) | 7.2 | Dry | 100 | 30/40 | 100 | 100 | 100 | 100 |
| | | Wet | 40 | | 80/90 | 90+ | 80/90 | 70/80 |
| | | Wet-lime | 40 | 5 | 90+ | 90 | 80 | 80 |
| Green trap rock (Charlottesville stone) | 8.4 | Dry | 100 | 0 | 100 | 100 | 100 | 100 |
| | | Wet | 0/5 | 0 | 70/80 | 20/30 | 40 | 20 |
| | | Wet-lime | 0/5 | 0 | 90+ | 90/100 | 90 | 70/80 |
| Trap-rock, New Jersey | 7.5 | Dry | 100 | 0/5 | 100 | 100 | 100 | 80/90 |
| | | Wet | 0 | | 70 | 5 | 20 | 0/5 |
| | | Wet-lime | 5/10 | | 100 | 60/70 | 90 | 10/20 |

[1] Mix evaluation—Per cent coated directly after mixing.
[2] Per cent of aggregate surface still coated with asphalt. Aggregate cured 1 hour at room temperature, then placed in water for 20 hours at 140° F.

The above tests were considered very drastic and in the following circular track tests, a laboratory method is devised which is very similar to that of actual road tests. A circular track was employed which consisted of a concrete trough 2 ft. wide and 16 ft. in mean diameter in which hot-mixed paving mixture is placed and then compacted by the machine. The machine consists of a centrally pivoted, mechanically rotated beam supporting at its end two truck wheels equipped with heavy duty tires which have been loaded to give a dead weight of 1000 lb. on each tire. The linear speed of the wheels is 4.54 M. P. H. and they make seven passages from one side of the trough to the other each hour, to eliminate rutting. After suitable compaction followed by a curing period, the asphalt-aggregate mixture is broken down by running the wheels over the track submerged under water the wheels around the tracks before failure. On the other hand, where lead naphthenate was added to the asphalt used in bonding the wet rock that had been lime pretreated, the paving prepared withstood over 13,000 revolutions before failure occurred, whereas without lime pretreatment, failure of the treated asphalt occurred in 4100 revolutions.

In reference to tests in which organic acids or the heavy metal or alkaline earth salts of sulfonic acids were used, the following data are given:

Mix Formula 200 gm. ¼–½" New Jersey trap-rock wet with:
 4 gm. water, then
 [1]1 gm. hydrated lime was added, followed by
 3 cc. V. M. & P. naphtha containing the treatment and
 11 gm. 90/100 penetration asphalt at 300° F.

[1] Omitted in case of no lime pretreatment tests.

| Asphalt and added wetting agents | No lime pretreat.— coating ability | Using lime pretreatment | | |
|---|---|---|---|---|
| | | Coating ability | Adhesivity 140° F. | |
| | | | After 1 hour cure [1] | After 24 hours cure [1] |
| None | 0/5 | 10 | 0/5 | 0/5 |
| 2.6% naphthenic acid | 0/5 | 95+ | 50 | 30 |
| 2.6% lead sulfonate | 10 | 80/90 | 95/100 | 95 |
| 1.3% lead sulfonate | 20 | 50 | 80 | 70/80 |
| 2.6% calcium sulfonate | 10 | 90+ | 95/100 | 95+ |
| 1.3% calcium sulfonate | 10 | 80/90 | 90 | 90+ |

[1] At room temperature.

These results show the effectiveness to be obtained by using lime pretreatment on the aggregate when the agent is dissolved in the naphtha prime. The results also show the partial effectiveness of treatment with naphthenic acids which does not result in as high an adhesivity as was obtained with the sulfonate salts, but which may be sufficient in practice.

A cutback asphalt also may be used according to this invention, for example, R. C. type cutback, prepared by the blending of approximately 25% of naphtha and 75% of 90/100° F. penetration asphalt of Venezuelan grade, after treatment with 1.5 and 2% of lead naphthenate by weight gave the following results when applied to wet trap-rock:

| Agent used | Per cent on cutback | Aggregate | Condition | Lime, per cent | Coated on mixing | Stripping resistance at room temperature after curing 4 hours | Adhesivity 140° F. H₂O displacement test, 24 hour cure [1] |
|---|---|---|---|---|---|---|---|
| Pb naphthenate | 1.5 | Trap-rock | Wet | 0 | 95+ | 30/40 | 40/50 |
| Do | 1.5 | do | do | 0.5 | 100 | 70 | 100 |
| Do | 2.0 | do | do | 0 | 95+ | 30/40 | 80 |
| Do | 2.0 | do | do | 0.5 | 100 | 60 | 100 |

[1] After 24 hours' cure at 140° F.

In the above table, the term "stripping resistance" is defined as the percentage of the aggregate surface still remaining coated with asphalt after the coated mixture has been cured for 4 hours at room temperature and then placed in water maintained at room temperature for a period of 20 hours. The metallic salts that may be used according to this invention are those composed of metals of groups 2 to 8 and division B of group 1 of the periodic system and are preferably water-insoluble but oil-soluble salts of organic acids.

Although in most cases the treatment of the asphalt with a suitable quantity of lead naphthenate permits its satisfactory application to wet aggregates, especially when the latter are previously mixed with small amounts of hydrated lime, in certain cases even this treatment does not produce satisfactory results.

It has been found that if a small percentage of an acidic body, preferably a free organic acid, for example 1 to 3% of naphthenic acids, is incorporated into the asphalt containing the lead naphthenate, then satisfactory coating can be obtained on those aggregates which are extremely difficult to coat when wet. For example, a wet granite aggregate which the following tests show could not be very satisfactorily coated with hot asphalt, untreated or treated with lead naphthenate, was satisfactorily coated when the wet stone was pretreated with lime and the asphalt contained both lead naphthenate and naphthenic acids.

Coating Ability of Hot Asphalt on Lime Pretreated Wet Granite

| Treatment in asphalt | Per cent of aggregate coated |
|---|---|
| None | 0 |
| 2.5% lead naphthenate | 50 |
| 2.5% lead naphthenate and 2.0% naphthenic acids | 90+ |

In addition, the ability of the resultant asphalt coating on the wet stone to resist displacement by water (i. e. adhesivity), even at elevated temperatures, is greatly increased, viz:

Adhesivity of Asphalt to Wet, Lime Pretreated Granite Aggregate

| Treatment on asphalt | Adhesivity at 140° F. |
|---|---|
| None | 0 |
| 2.5% lead naphthenate | 10 |
| 2.5% lead naphthenate and 2.0% naphthenic acids | 80 |

The suggested method of treatment is therefore of decided advantage in the field when wet aggregates, which cannot be satisfactorily coated with asphalt containing lead naphthenate alone, must be employed. With this dual treatment of the asphalt, both the coating ability and the adhesivity of the resultant asphalt coating are greatly improved. Where no metallic salts were added, coating of the aggregates was improved materially but with a lower attendant loss of adhesivity, as shown in the following table:

Lime Pretreated, Wet Granite Aggregate

| Treatment in asphalt | Per-cent coated on mixing | Adhesivity at 140° F. |
|---|---|---|
| 2.0% naphthenic acids | 100 | 10/20 |

I claim:

A method of coating a damp mineral aggregate and bonding the damp mineral aggregate which comprises coating the damp mineral aggregate with 0.5 to 1% of hydrated lime, and adding to the mixture thereby obtained asphalt in fluid condition containing, at the time of contact with the aggregate, from 1 to 3% of lead naphthenate and 1 to 3% of naphthenic acid.

JOSEPH C. ROEDIGER.